United States Patent
Mattlage et al.

(10) Patent No.: US 6,892,490 B2
(45) Date of Patent: May 17, 2005

(54) FISHING HOOK

(76) Inventors: Mike Mattlage, P.O. Box 85, West, TX (US) 76691; Chris Coody, 8685 N. Lonestar Pkwy., Crawford, TX (US) 76638

( * ) Notice: Subject to any disclaimer, the term of this patent is extended or adjusted under 35 U.S.C. 154(b) by 0 days.

(21) Appl. No.: 10/461,923

(22) Filed: Jun. 13, 2003

(65) Prior Publication Data
US 2004/0261310 A1  Dec. 30, 2004

(51) Int. Cl.$^7$ ............................................. A01K 83/00
(52) U.S. Cl. ..................................................... 43/43.16
(58) Field of Search ............................ 43/43.16, 44.82

(56) References Cited

U.S. PATENT DOCUMENTS

| | | | | |
|---|---|---|---|---|
| 4,237,184 | A * | 12/1980 | Gonseth et al. | 428/336 |
| 4,284,687 | A * | 8/1981 | Dreyer et al. | 428/336 |
| 4,442,169 | A * | 4/1984 | Graham | 428/332 |
| 4,463,033 | A * | 7/1984 | Kikuchi et al. | 42/255.34 |
| 4,497,874 | A * | 2/1985 | Hale | 428/551 |
| 4,928,423 | A * | 5/1990 | Furuta | 43/43.16 |
| 4,953,321 | A * | 9/1990 | Furuta | 43/43.16 |
| 5,084,998 | A * | 2/1992 | Dixon | 43/43.16 |
| 5,526,603 | A * | 6/1996 | Fujii et al. | 43/43.16 |
| 6,007,871 | A * | 12/1999 | Horikoshi et al. | 427/255.39 |
| 6,691,449 | B1 * | 2/2004 | Hoben | 43/43.16 |
| 2001/0015029 | A1 * | 8/2001 | Carter et al. | 43/44.81 |
| 2004/0006908 | A1 * | 1/2004 | Essad et al. | 43/42.13 |
| 2004/0055205 | A1 * | 3/2004 | Pack | 43/42.53 |

FOREIGN PATENT DOCUMENTS

| | | | |
|---|---|---|---|
| EP | 380735 | A1 * | 8/1990 |
| GB | 2383932 | B1 * | 7/2003 |
| JP | 2-203728 | B1 * | 8/1990 |
| JP | 2002-335814 | B1 * | 8/1990 |
| JP | 4-881540 | B1 * | 3/1992 |
| JP | 5-123084 | B1 * | 5/1993 |
| JP | 5-137478 | B1 * | 6/1993 |
| JP | 5-320824 | B1 * | 12/1993 |
| JP | 5-320829 | B1 * | 12/1993 |
| JP | 6-113699 | B1 * | 4/1994 |
| JP | 7-289120 | B1 * | 11/1995 |
| JP | 6-269236 | B1 * | 10/1998 |
| JP | 10-276616 | B1 * | 10/1998 |
| JP | 2003-289757 | B1 * | 10/2003 |

* cited by examiner

*Primary Examiner*—Darren W. Ark
(74) *Attorney, Agent, or Firm*—David G. Henry

(57) ABSTRACT

An improved fishing hook is provided. The fishing hook is made of a wear-resistant material of either: (a) 85% to 96% tungsten carbide and 4% to 15% cobalt, (b) 60% to 89% tungsten carbide, 4% to 28% tantalum carbide, 4% to 25% titanium carbide and 3% to 30% cobalt, or (c) 34% to 51% cobalt, 25% to 32% chromium, 14% to 21% tungsten, 2% to 4% carbon and one or more of the metals nickel, silicon, columbium, manganese and iron which, together, comprise no more than 16% of the material. For material "b", preferably the composition contains about 5% to 13% cobalt, 65% to 89% tungsten carbide, titanium carbide and tantalum carbide which, together, are present in an amount no greater than 30% of the composition of the material. For material "c", preferably the composition contains about 28% to 32% chromium, 43% to 48% cobalt, tungsten and one or more of nickel, silicon, iron, manganese, columbium and carbon which, together, are present in an amount no greater than 29% of the composition of the material.

5 Claims, No Drawing Sheets

FISHING HOOK

BACKGROUND OF THE INVENTION

The invention relates to an improved wear-resistant composition of materials used for fishing hook construction.

Conventional fishing hooks are made of one form or another of metal. However, the present materials (stainless steel probably representing the best performing material) are not optimal, at least when compared to the fishing hook of the present invention, as will be disclosed hereafter.

Presently available fishing hooks deteriorate (especially when used in salt water environments, although such does occur in all contexts) and fail to retain the sharpness of their tips and barbs.

Heat-treating a fishing hook to form a hard penetrating surfaces will still produce a hook which will dull very quickly. This, in turn, reduces the frequency of successful catches.

Objects of the invention include an improved fishing hook exhibiting a penetrating and barb surfaces and tips which are of high hardness, low coefficient of friction and extended service life, and which are economically feasible for commercial production.

SUMMARY OF THE INVENTION

A wear-resistant fishing hook is provided having at least penetrating tip and barb surfaces of 85% to 96% tungsten carbide and 4% to 15% cobalt, or, alternatively, a composition comprising 60% to 89% tungsten carbide, 4% to 28% tantalum carbide, 4% to 25% titanium carbide, and 3% to 30% cobalt. The fishing hook composition preferably comprises 65% to 89% tungsten carbide, 5% to 13% cobalt, and titanium carbide and tantalum carbide which, together, are present in an amount no greater than 30% of the composition. The fishing hook may be a pair of hand shears, a knife or similar tools. As a second alternative, a wear-resistant fishing hook is provided having a cutting edge made of a composition comprising 34% to 51% cobalt, 25% to 32% chromium, 14% to 21% tungsten, 2% to 4% carbon, and one or more of the metals nickel, silicon, columbium, manganese and iron which, together, comprise no greater than 16% of the composition. This alternative fishing hook composition preferably comprises 43% to 48% cobalt, 28% to 32% chromium, tungsten and one or more the metals nickel, silicon, iron, manganese, columbium and carbon which, together, are present in an amount no greater than 29% of the composition. This alternative fishing hook may also be a pair of hand shears, a knife or similar tools.

DETAILED DESCRIPTION OF THE PREFERRED EMBODIMENTS

An improved fishing hook is provided. The penetrating points and barbs of the fishing hook are made of a wear-resistant material of either: (a) 85% to 96% tungsten carbide and 4% to 15% cobalt, (b) 60% to 89% tungsten carbide, 4% to 28% tantalum carbide, 4% to 25% titanium carbide and 3% to 30% cobalt, or (c) 34% to 51% cobalt, 25% to 32% chromium, 14% to 21% tungsten, 2% to 4% carbon and one or more of the metals nickel, silicon, columbium, manganese and iron which, together, comprise no greater than 16% of the material. For material "b", preferably the composition contains about 5% to 13% cobalt, 65% to 89% tungsten carbide, titanium carbide and tantalum carbide which, together, are present in an amount no more than 30% of the composition of the material. For material "c", preferably the composition contains about 28% to 32% chromium, 43% to 48% cobalt, tungsten and one or more of nickel, silicon, iron, manganese, columbium and carbon which, together, are present in an amount no greater than 29% of the composition of the material.

According to the present invention, these materials may be attached to the desired surfaces of an existing fishing hook of conventional material by cementing or brazing. These materials provide hardness and a low coefficient of friction, are typified by the cobalt, chromium, tungsten, tantalum, titanium, and carbon family of materials. While many modifications and additions to these basic components are possible and appear desirable in a certain range of compositions, certain combinations of carbon, tungsten, titanium and tantalum with cobalt appear to be essential in order to achieve commercially acceptable results within the spirit of the present invention.

The tungsten and carbon alloy presents a hard, wear-resistant surface and the titanium and tantalum provide a low coefficient of friction. Cobalt is the principal wetting agent in these alloys and bonds these materials to form the required wear-resistant component.

Other elements in relatively small percentages, such as iron, silicon, nickel and molybdenum, may be included but are incidental to the manufacture of these alloys.

A range of compositions has been tested and those combinations, which are in the family known in the art as cemented tungsten carbides, appear to operate well in the present invention.

Certain tests conducted in related arts indicate certain limitations relating to the essential metals. For example, it appears that compositions including less than approximately 3% cobalt do not have sufficient strength to prevent chipping or cracking of the metal to form a fishing hook of commercial usefulness. Further, as the percent of cobalt increases between 6% to about 13%, relatively good strength and wear-resistance is achieved. Also, it is noted that in tungsten carbide compositions having an increasing cobalt content between 13% and 25%, a reduced wear-resistance is found with high-impact strength.

Expectations are that excellent wear-resistance and strength is achieved in the range of compositions which include 5% to 13% cobalt in tungsten carbide compositions.

In general, compositions of at least approximately 60% to 89% tungsten carbide, 4% to 28% tantalum carbide, 4% to 25% titanium carbide and 3% to 30% cobalt are believed to be optimal.

In view of the commercially available compositions within these general limits which heretofore were used for completely different purposes, there appears to be no significant advantages to be gained by employing tungsten carbide compositions containing a cobalt content much greater than 13%.

Fishing hooks made in accordance with this invention exhibit superior performance compared to conventional types of hooks. Improvements in such performance criteria as penetrating point and barb point wear and high penetration facility. Such improvements are related to the fact that the invention provides for better edge strength, wear-resistance and coefficient of friction than has been possible previously in the context of fishing hooks.

The composition of the present invention has significant advantages compared to materials used for fishing hook construction previously. For example, the composition can be varied within the scope of this invention to provide superior wear-resistance or to provide a greater degree of toughness, as required. This is particularly advantageous in the critical wear areas of a fishing hook.

The ease of control of the composition permits a high quality fishing hook to be manufactured. The strength and durability of the penetrating surfaces exhibits the desired wear-resistance and toughness and represents an unexpected and significant advance in fishing hook construction.

In a fishing hook according to the present invention, the mode of wear is primarily individual particles flattening due to abrasion. It should be readily appreciated that, in such a cutting edge, the thousands of particles are being used to their fullest extent because the cobalt bonding agent is sufficiently strong to hold the particles in place and permit maximum utilization of the hard particles.

All percentages expressed herein are expressed as a weight percent basis.

The compositions according to the invention, generally, are made by conventional methods.

Cemented tungsten carbide is a product made by powder metals processing. The main stages in the manufacture of this material include: (1) Production of tungsten metal powder; (2) Preparation of tungsten carbide; (3) Preparation of alloyed and other carbides; (4) Addition of cobalt to produce grade powder; (5) Pressing; (6) Pre-sintering; and (7) Final sintering.

Tungsten oxide is reduced in hydrogen at a temperature of about 2000.degree. F. to form tungsten metal powder which is relatively soft. Carbon or lamp black is added to the tungsten powder and this mixture is carburized in an induction furnace at approximately 2800.degree. F. to form tungsten carbide powder.

Cobalt oxide is reduced in hydrogen at approximately 1800.degree. F. to produce cobalt metal powder.

Titanium oxide and tantalum oxide are mixed with carbon or lamp black and are reduced and carburized in an induction furnace at approximately 3200.degree. F. to produce titanium or tantalum carbide powder.

The above metals are the prime materials used to produce cemented tungsten carbide.

Selected powders are placed in a ball mill that contains acetone and is lined with cemented tungsten carbide and employs cemented tungsten carbide balls. The powders are crushed by the grinding action to produce a powder having a size range of 1–5 micrometers.

After ball milling for 3–5 days, the powder slurry is placed in trays and thoroughly dried. The powder is then screened and sifted through a series of fine metal screens to remove foreign matter and to remove oversize lumps.

Powders selected to produce a specific grade of cemented carbide are placed in blender and thoroughly mixed to obtain maximum strength and grade uniformity.

At this point in the process, the powders are ready for either hot pressing or cold pressing to form a final shape. Hot pressing is used primarily for the manufacture of larger carbide parts, and cold pressing is used for a variety of smaller parts.

In preparation for cold pressing, the dried powder is fed through a hammer mill and wax is added to the powder during the hammer milling operation. The powder/wax combination is placed in an open-ended tumbling machine and tumbled until small spheres are formed. The spheres, slightly larger than grains of salt, are then used to fill the mold cavity for the cold pressing operation. The purpose of forming the spheres is to allow the mold cavity to fill evenly and equalize the powder density throughout the mold.

The pressed blanks are fed through a hydrogen atmosphere furnace at approximately 2000.degree. F. and the wax is removed from the pressed blank. At this stage, the blanks have the strength of chalk and can be machined to form required angles or holes, or whatever is required in the final blank design.

The blank is placed in a vacuum or hydrogen atmosphere furnace and heated to approximately 2800.degree. F. and, during this operation, the blanks assume their final size and hardness while shrinking from 20% to 30% of their original volume.

The hard metal blanks generally have a hardness ranging from 84 Rockwell A to 92.8 Rockwell A, depending on the size of the carbide particles and the percentage of cobalt binder used during the sintering operation.

The blank can be used in the sintered state or it can be machined by diamond grinding to form a desired surface finish. In order for the small carbide blank to be used effectively, it may be attached to a larger or heavier backing material such as a steel shank.

Techniques for securing the carbide tip or barb blank to a steel fishing hook body include brazing, cementing or by mechanical fastening.

Brazing is one of the more common methods of securing carbide inserts to steel, and this is readily accomplished by the following steps: (1) Clean both mating surfaces; (2) Coat each mating surface with Handy Flux (product of Handy & Harmon Co.); (3) Position brazing shim approximately 0.003 inch thick between mating surfaces; and (4) Apply heat by hand torch or induction coil.

The most common brazing alloy used and approved by the American Welding Society is designated BAg3 having a brazing temperature in the range of 1270.degree. F. to 1550.degree. F. with a solidus temperature of 1170.degree. F. The total braze thickness generally is 0.0015 inch to 0.0025 inch which gives a shear strength of 70,000 to 100,000 psi.

Use of adhesives or cement is another method used to secure carbide to a base material, especially where operating temperature are low and where bond strength requirements are low. The most common adhesive is a two-part epoxy resin and these epoxy cements set completely in a few minutes at room temperature.

Hard, cemented tungsten carbide may be machined by several techniques. A very common method is by use of a diamond wheel. Excellent surface finish and sharp edges can be produced on cemented carbide by using proper wheel selection. Proper wheel selection involves wheel diameter, diamond mesh size, diamond concentration, bonding material, wheel speed, depth of cut, and use of sufficient coolant or no coolant.

The 8 to 10 AA surface finish required to produce the sharp penetrating edges and tips of a fishing hook according to this invention is obtained by rough grinding with a 100-mesh resinoid diamond wheel and finish ground with a 220-mesh resinoid diamond wheel. To minimize heat buildup, a flood of coolant must be used during the rough and finish grinding.

Depth of cut or down feed using the 100-mesh diamond wheel should be 0.001 inches per cycle until the surface is clean. The final surface finish is generated with the 220-mesh diamond wheel using 0.001 inch depth of cut until the last 5 or 6 cycles when 0.0005 inch depth of cut should be used to generate the final surface finish of 8 to 10 AA.

The manufacture of material "a" and "b" has been described in the above paragraphs. The material classified as "c" is made by melting the ingredients in an electric furnace and chill casting in permanent molds to obtain the required blanks. The hardness of the chilled tip or barb blanks ranges from 62 to 64 Rc. The blanks are attached to a steel hook body by the same procedure as outlined for brazing of the cemented carbide blanks.

The blanks are easily machined by using 100- to 120-mesh aluminum oxide grinding wheels of a soft grade structure. Wheel speeds of 3800 to 4200 surface feet per minute and a depth of cut of 0.0015 to 0.0025 inches per cycle, along with a flood of coolant, will produce 10 to 12 AA surface finish.

The examples which follow are intended to be illustrative of the invention but not to limit in any way the scope of the claims below.

EXAMPLE 1

A material composition was prepared according to the above procedures to produce a composition of 94% tungsten carbide and 6% cobalt. All percentages are by weight unless otherwise indicated. The specimens were affixed to fishing hook bodies by brazing and then finished by grinding to form the required edges and tips.

EXAMPLE 2

A material composition was prepared according to the above procedures to produce a composition of the following proportions: 76% tungsten carbide, 12% titanium carbide, 4% tantalum carbide and 8% cobalt. The specimens were affixed to fishing hook bodies by brazing and finished by grinding to form the required contours.

EXAMPLE 3

A material composition was prepared according to the procedures outlined for material "c" to produce a composition having the following proportions: 48% cobalt, 31% chromium, 14% tungsten, 2% carbon, 2% columbium, 1% manganese and 2% iron. During the manufacture of this material, the chromium content was converted to chromium carbide which has good wear resistance and a low coefficient of friction. The material was machined to form fishing hook of highly desirable characteristics.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. An improved fishing hook, wherein the improvement comprises said improved fishing hook having at least a penetrating tip and a barb thereof made of a composition consisting essentially of 85% to 96% tungsten carbide and 4% to 15% cobalt.

2. An improved fishing hook, at least a penetrating tip and a barb thereof made of a composition consisting essentially of:
    (a) 60% to 89% tungsten carbide,
    (b) 4% to 28% tantalum carbide,
    (c) 4% to 25% titanium carbide, and
    (d) 3% to 30% cobalt.

3. The fishing hook of claim 1 wherein said composition consists essentially of:
    (a) 65% to 89% tungsten carbide,
    (b) 5% to 13% cobalt, and
    (c) titanium carbide and tantalum carbide which, together, are present in an amount no greater than 30% of said composition.

4. An improved fishing hook, wherein the improvement comprises said improved fishing hook having at least a penetrating tip and a barb thereof made of a composition consisting essentially of:
    (a) 34% to 51% cobalt,
    (b) 25% to 32% chromium,
    (c) 14% to 21% tungsten,
    (d) 2% to 4% carbon, and
    (e) one or more of the metals nickel, silicon, columbium, manganese and iron which, together, comprise no greater than 16% of said composition.

5. The improved fishing hook of claim 4 wherein said composition consists essentially of:
    (a) 43% to 48% cobalt,
    (b) 28% to 32% chromium, and
    (c) tungsten and said one or more of the metals nickel, silicon, iron, manganese, columbium and carbon which, together, are present in an amount no greater than 29% of said composition.

* * * * *